United States Patent
Schmid et al.

(10) Patent No.: US 10,471,459 B2
(45) Date of Patent: Nov. 12, 2019

(54) DEVICE FOR PREPARING AND APPLYING ADHESIVE

(71) Applicants: HOMAG GMBH, Schopfloch (DE); HENKEL AG & CO. KGAA, Düsseldorf (DE)

(72) Inventors: Johannes Schmid, Starzach Wachendorf (DE); Knut Hoffmann, Düsseldorf (DE); Jürgen Lotz, Kiedrich (DE)

(73) Assignees: HOMAG GMBH, Schopfloch (DE); HENKEL AG & CO. KGAA, Düsseldorf (DE)

( * ) Notice: Subject to any disclaimer, the term of this patent is extended or adjusted under 35 U.S.C. 154(b) by 0 days.

(21) Appl. No.: 15/317,431

(22) PCT Filed: May 7, 2015

(86) PCT No.: PCT/EP2015/060074
§ 371 (c)(1),
(2) Date: Dec. 9, 2016

(87) PCT Pub. No.: WO2015/188991
PCT Pub. Date: Dec. 17, 2015

(65) Prior Publication Data
US 2017/0120288 A1    May 4, 2017

(30) Foreign Application Priority Data
Jun. 12, 2014   (DE) .................. 10 2014 211 293

(51) Int. Cl.
*B05C 1/08*     (2006.01)
*B05C 11/10*    (2006.01)
(Continued)

(52) U.S. Cl.
CPC .............. *B05C 1/08* (2013.01); *B01F 5/0615* (2013.01); *B01F 7/248* (2013.01);
(Continued)

(58) Field of Classification Search
CPC .... B05C 1/08; B05C 1/10; B05C 5/02; B05C 11/10; B05C 11/1036; B05C 11/1042;
(Continued)

(56) References Cited

U.S. PATENT DOCUMENTS 3,410,713 A * 11/1968 Schneidereit ......... B05C 1/0813
                                                    118/204
4,692,350 A *  9/1987 Clarke .................. E01C 19/176
                                                     106/122

(Continued)

FOREIGN PATENT DOCUMENTS

DE      37 27 847 A1    3/1989
DE     196 50 125 A1    6/1998
(Continued)

OTHER PUBLICATIONS

English Translation of JPH0462101 A, Toshimichi et al, Pot Life-Extending Apparatus in Automatic Coating Machine for Adhesive (Feb. 27, 1992).*

(Continued)

*Primary Examiner* — Laura Edwards
(74) *Attorney, Agent, or Firm* — Paul D. Strain, Esq.; Strain & Strain PLLC

(57) ABSTRACT

The invention relates to a device for preparing and applying adhesive, comprising a feed unit, a preparing unit, and an application unit, wherein the feed unit is used to feed a basic component of the adhesive and/or of at least one additive, wherein the preparing unit effects continuous mixing of the basic component of the adhesive with the one or more fed additives to form the prepared adhesive and continuous (Continued)

conveying of the prepared adhesive, wherein the adhesive prepared in such a way is conveyed from the preparing unit into the application unit and can be applied to a workpiece by the application unit.

24 Claims, 6 Drawing Sheets

(51) Int. Cl.
*B29B 7/32* (2006.01)
*B29B 7/40* (2006.01)
*B29B 7/60* (2006.01)
*B01F 5/06* (2006.01)
*B01F 7/24* (2006.01)

(52) U.S. Cl.
CPC .......... *B05C 11/1042* (2013.01); *B29B 7/325* (2013.01); *B29B 7/40* (2013.01); *B29B 7/60* (2013.01); *B01F 2005/0637* (2013.01); *B01F 2215/006* (2013.01); *B01F 2215/0039* (2013.01)

(58) Field of Classification Search
CPC .... B05C 11/1047; B01F 7/248; B01F 5/0615; B01F 2215/006; B01F 2005/0637; B01F 5/0057; B01F 5/0062; B01F 5/0065; B01F 5/0471; B01F 5/0475; B01F 5/048; B01F 5/0481; B01F 5/0486; B01F 5/049; B01F 5/0493; B29C 65/485; B29C 65/52; B44C 7/04; Y10T 156/1798
USPC ......... 118/202, 259, 271, 304, 302; 156/578
See application file for complete search history.

(56) References Cited

U.S. PATENT DOCUMENTS

| | | | |
|---|---|---|---|
| 5,979,794 A | 11/1999 | Defillipi et al. | |
| 7,160,025 B2* | 1/2007 | Ji | B01F 5/0646 366/341 |
| 2011/0026359 A1 | 2/2011 | Ritter | |
| 2011/0199855 A1* | 8/2011 | Hanada | B01F 5/0646 366/165.1 |
| 2018/0280898 A1* | 10/2018 | Hoffmann | B01F 3/1221 |

FOREIGN PATENT DOCUMENTS

| | | |
|---|---|---|
| DE | 10 2008 019 433 A1 | 12/2009 |
| EP | 1 243 345 A2 | 9/2002 |
| EP | 1 375 008 A2 | 1/2004 |
| EP | 1 743 777 A1 | 1/2007 |
| EP | 1800738 A1 * | 6/2007 |
| JP | H04-62101 A | 2/1992 |
| WO | WO 99/07462 A1 | 2/1999 |
| WO | WO 2005/095225 A1 | 10/2005 |
| WO | WO 2009/059753 A1 | 5/2009 |
| WO | WO 2013/164719 A1 | 11/2013 |

OTHER PUBLICATIONS

International Search Report, PCT/EP2015/060074, dated Jul. 17, 2015, 3 pgs.

German Search Report, Appl. No. 10 2014 211 293.1, dated Nov. 25, 2014, 7 pgs.

* cited by examiner

_US 10,471,459 B2_

DEVICE FOR PREPARING AND APPLYING ADHESIVE

CROSS-REFERENCE TO RELATED PATENT APPLICATIONS

This application is a National Stage of International Application No. PCT/EP2015/060074, filed May 7, 2015, which is based upon and claims the benefit of priority from prior German Patent Application No. 10 2014 211 293.1, filed Jun. 12, 2014, the entire contents of all of which are incorporated herein by reference in their entirety.

TECHNICAL FIELD

The invention relates to a device for preparing and applying adhesive.

PRIOR ART

Large-area boards that have to be cut to size and which on the narrow edges thereof are provided with an edge strip are employed in the making of furniture or furniture elements. The edge strip herein is adhesively bonded to the narrow side of the board by means of an adhesive. It has been demonstrated herein that the requirements set for the adhesive vary and, depending on the furniture element and/or furniture and/or application case and/or field of application, should have dissimilar properties.

In this way, a standardized adhesive that is employed in the case of all applications and in the case of all furniture elements is usually used in the making of furniture or furniture elements. The adhesive herein, by virtue of the color thereof, is hardly visible in the case of many color combinations, wherein the adhesive in the case of other color combinations of the furniture or of the furniture element has a visually more disadvantageous appeal, because the color of said adhesive rather does not match the color of the furniture or the furniture element. Employing an adhesive that is colored in a corresponding manner often fails due to the amounts of adhesive that have to be procured from an adhesives manufacturer and that can only be economically purchased in the case of very high volumes that are to be processed.

EP 1 743 777 A1 discloses an adhesive-application station that allows admixing of dyes to the adhesive. The adhesive-application station does, however, have the disadvantage that the amounts of adhesive that are producible therewith may only be produced in a discontinuous operation. Herein, mixing is performed after adding the dye in a metered manner to the adhesive, wherein the mixing apparatus is removed after the adhesive has been mixed, and the adhesive is squeezed out of an exit slot by displacing the piston that is provided in the housing of the station. Once the thus produced adhesive been consumed, the station has to be refilled with new adhesive, the mixing apparatus has to be re-inserted, and a new batch of the adhesive has to be produced and mixed. Therefore, this station is not suitable for a continuous operation at an industrial scale for manufacturing comparatively large volumes of furniture or furniture elements.

It is also often desired that the adhesive is adapted in a targeted manner to the application purpose thereof, or to the application purpose of the furniture.

Illustration of the Invention, Object, Achievement, Advantages

It is the object of the invention to achieve a device for preparing and applying adhesive, that allows adhesives to be individually tailored and that nevertheless is also employable in the artisan sector or else for amounts that are processable at an industrial scale.

This object is achieved by the features of the embodiments of the application.

One exemplary embodiment of the invention relates to a device for preparing and applying adhesive, having an infeed unit, a preparation unit, and an application unit, wherein the infeed unit serves for infeeding a basic component of the adhesive and/or at least one, additive, wherein the preparation unit effects continuous mixing of the basic component of the adhesive and the infed additives, so as to form the prepared adhesive, and continuous conveying of the prepared adhesive, wherein the thus prepared adhesive is conveyed from the preparation unit into the application unit, and is capable of being applied to a workpiece by the application unit. On account thereof, depending on the adhesive required for the respective workpiece to be processed, the adhesive, proceeding from a basic component, may be provided and mixed with selectable additives such that the adhesive produced in this manner may be applied to the workpiece. In this way, the color may advantageously be chosen by way of additives, and additionally or alternatively, the chemical properties and/or the biological properties and/or the physical properties of the adhesive may also be influenced. In this way, biocide properties may be influenced in order to reduce the formation of mold, or the resistance to water may be improved. Electrical properties may also be influenced in a targeted manner.

According to the invention it is advantageous for the infeed unit to have a metering unit for infeeding the basic component and/or at least one additive in a metered manner. In this way, both the basic component as well as the selected additive, or the selected additives, may be infed at the required amounts in a metered manner. Alternatively also, only the basic component may be infed in a metered manner, and the additives in a simplified version may be manually infed.

Alternatively, it is also advantageous for the preparation unit to have a metering unit for infeeding at least one additive in a metered manner.

Alternatively, it is also advantageous for the infeed unit to allow manual infeeding of the basic component and/or of at least one additive, or to have such an infeed. On account thereof, in the simplest case manual infeeding may be performed by means of the infeed unit such that corresponding mixing and applying may be subsequently performed.

It is also advantageous for the infeed unit to allow controlled infeeding of the basic component and/or of at least one additive, or to have such an infeed. On account thereof, in an alternative design configuration, automated infeeding may be performed in a controlled manner by means of the infeed unit such that corresponding mixing and applying may be subsequently performed.

Alternatively, it is also advantageous for the preparation unit to allow controlled infeeding of the basic component and/or of at least one additive, or to have such an infeed. In this way, apart from infeeding from the infeed unit, metered addition at a later stage may also be performed.

It is also advantageous herein for the infeed unit and/or the preparation unit to comprise at least one pump which effects continuous infeeding or conveying of the basic component. Herein, a dedicated pump which may also serve for conveying the mixed adhesive may be provided for the basic component. Alternatively, a pump for conveying the mixed adhesive may also be provided. It may also be advantageous for one pump to be provided for at least one additive or for a plurality of additives, or for each additive. In this way, the pump may be configured as a gear pump or as an injector or similar, for example.

Alternatively, it is particularly advantageous herein for the infeed unit and/or the preparation unit to comprise a pump which effects continuous or discrete infeeding of at least one additive. In this way, the additive may be metered with a view to the desired mixture.

It is also advantageous for the infeed unit and/or preparation unit to have a heater for melting the basic component and/or at least one additive. In this way, the adhesive may be processed as a hot-melt adhesive so as to melt the primary material of the basic component.

It is also advantageous for the preparation unit to have a mixing device for mixing the basic component and/or the at least one additive. On account thereof, good homogenization of the adhesive as a mixture of the basic component and of the used additives is achieved.

It is particularly advantageous for the preparation unit to have a mixing device having a mixing chamber for mixing the basic component and/or the at least one additive.

Alternatively, it is advantageous for the preparation unit to have a static or dynamic mixing means in the mixing chamber. On account thereof, mixing of the adhesive may be improved and be carried out in less time.

It is particularly advantageous herein for the dynamic mixing means to be a driven, such as, in particular, a rotatable mixing means. In this way, particularly effective mixing may be performed.

It is also particularly advantageous for the static mixing means to be a stationary mixing means in the mixing chamber and/or on a wall of the mixing chamber. On account thereof, a particularly cost-effective solution may be found.

It is also advantageous for the static mixing means to be formed by a hollow-cylindrical chamber having a helically configured flow path therein. On account thereof, good intermixing across the length of the flow path is achieved.

It also advantageous for the helically configured flow path to be formed by a helical spiral that inserted into the hollow-cylindrical chamber. In this way, the mixing means may be configured in a particularly simple manner. If the spiral is retrievable, simple cleaning may thus also be performed.

It is furthermore advantageous for the static mixing means to be configured by a helical spiral that is disposed or configured on the wall of the mixing chamber. Said helical spiral may project from the wall, or may be incorporated in the wall as a type of groove. On account thereof, a helical flow that effects mixing is effected.

It is also advantageous for the preparation unit to have a distribution device for distributatively admitting the basic component and/or for distributatively admitting at least one additive into the mixing chamber. On account thereof, a good precondition for good intermixing is achieved, because the basic component and/or the at least one additive prior to intermixing is or are, respectively already distributed in the mixing chamber.

It is also advantageous herein for the mixing chamber to have an outlet opening for discharging the mixed adhesive to the application unit. In this way, the mixed adhesive may be continuously discharged from the preparation unit, in order to fill the application unit and in order to ideally achieve a continuous application process.

It is particularly advantageous herein for the application unit to have means for applying the adhesive. In this way, the adhesive may be applied in a targeted manner to the workpiece to the processed.

It is particularly advantageous for the means for applying the adhesive to have a nozzle and/or an application roller. In this way, application of the adhesive may be performed in a targeted and metered manner.

It is advantageous herein for the application unit to have a reservoir for the intermediate storage of a defined amount of the adhesive. On account thereof, it is achieved that a certain reserve of adhesive is available that may be applied while the preparation unit is being filled, or a changeover of the additives is being performed, for example.

In the case of one particularly advantageous exemplary embodiment it is expedient for the reservoir to serve as the infeed unit and the preparation unit.

Herein, in one advantageous exemplary embodiment, it is expedient for mixing in the reservoir to be performed by virtue of the rotation of the application roller. In this way, a flow that contributes toward improved mixing is generated by the application roller in the amount of adhesive in the reservoir.

It is also advantageous for an additive to be a substance that influences chemical properties, the biological properties, and/or the physical properties of the adhesive.

Herein, in an advantageous exemplary embodiment, an additive is a dye, a means for improving the resistance to moisture or the resistance to the formation of mold, a biocide means, an additive for improved absorption of energy, and/or a primer for improved adhesive bonding.

Further advantageous design embodiments are described by the following description of the figures and by the dependent claims.

BRIEF DESCRIPTION OF THE FIGURES

The invention will be explained in more detail hereunder based on at least one exemplary embodiment by means of the drawings in which.

PREFERRED EMBODIMENT OF THE INVENTION

Figure 1:
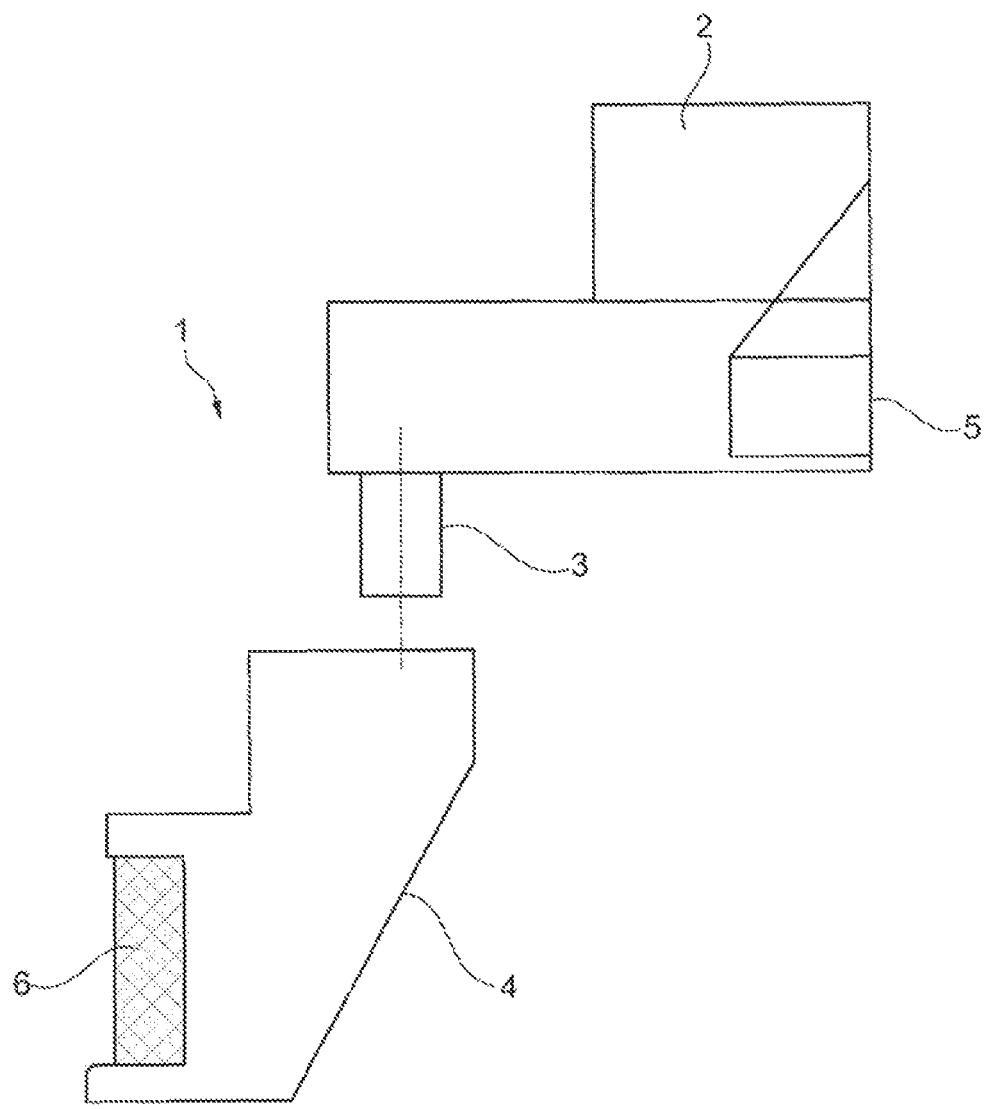
FIG. 1 shows a first exemplary embodiment a device according to the invention, for preparing and applying adhesive.

FIG. 1 shows a first exemplary embodiment of a device 1 according to the invention, for preparing and applying adhesive, having an infeed unit 2, a preparation unit 3, and an application unit 4.

The infeed unit 2 serves for infeeding the basic component of the adhesive, wherein the basic component of the adhesive may be made available already in liquid, pasty, or fluid form.

Also, the basic component of the adhesive may be made available as a solid material, as granules, or as powder or similar, and be filled into the infeed unit 2. To this end, the infeed unit 2 may have a melting unit 5 which serves for melting the basic component. The basic component is infed from the infeed unit 2 to the preparation unit 3 to which in turn additives may be infed.

The basic component and the additive or additives are then mixed in the preparation unit 3. To this end, a driveless rotating mixer, a driven rotating mixer, or a static non-rotating mixer may be provided in the preparation unit 3, said mixer mixing the components to be mixed in the preparation unit 3. The mixed components of the adhesive are then guided from the preparation unit 3 into the application unit 4 from where the adhesive may be applied to a workpiece. To this end, the application unit 4 has a means such as an application roller 6, for example, by which the application onto the workpiece may be performed.

However, the infeed unit 2 may also serve for infeeding the basic component of the adhesive, and at least one additive such that the infeed unit 2 is already infed the basic component and the at least one additive, then guiding the two latter onward to the preparation unit, for example in order for the components to be mixed.

Infeeding of the basic component to the infeed unit and/or to the preparation unit herein is preferably performed in a controlled automated manner. In one further exemplary embodiment of the invention, the one or the other component may also be manually infed.

The preparation unit 3 effects continuous mixing of the basic component of the adhesive and the infed additive or additives, so as to form the prepared adhesive, and said preparation unit 3 also effects continuous conveying of the prepared adhesive. To this end, the preparation unit preferably has a pump which conveys the basic component or the mixed adhesive. If only the basic component is conveyed by the pump, then the mixed adhesive is also conveyed because the basic component accounts for the major part of the mixed adhesive.

Figure 2:
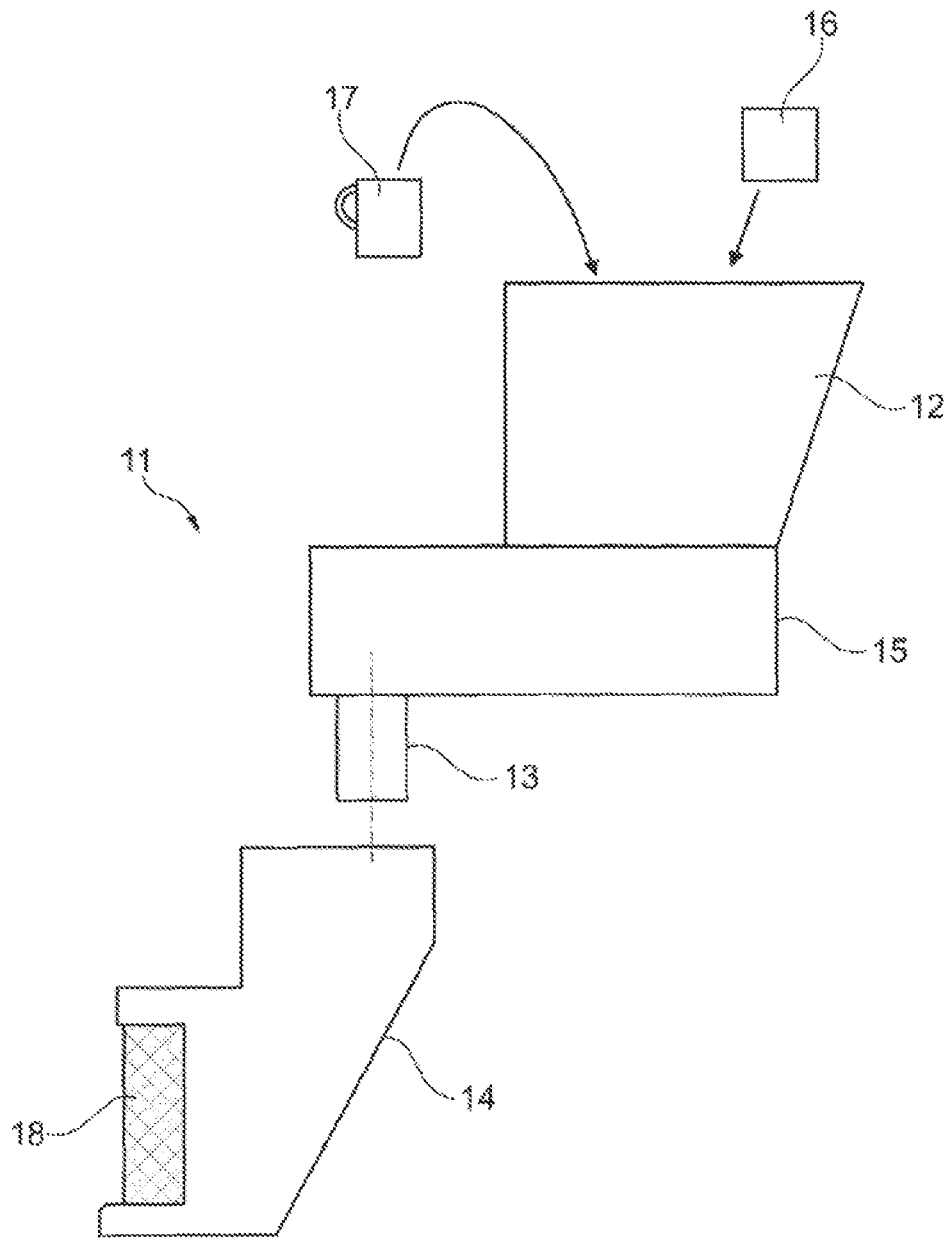
FIG. 2 shows a further exemplary embodiment of a device according to the invention, for preparing and applying adhesive.

FIG. 2 shows a further exemplary embodiment of a device 11 according to the invention, for preparing and applying adhesive, having an infeed unit 12, a preparation unit 13, and an application unit 14. The infeed unit 12 again serves for infeeding the basic component 16 of the adhesive, wherein the basic component 16 of the adhesive may be made available in liquid or fluid form, as has already been elaborated above. Also, the basic component 16 of the adhesive may be made available as a solid material, as granules, or as a powder or similar, and be filled into the infeed unit 12. To this end, the infeed unit 12 may optionally have a melting unit 15 which serves for melting the basic component 16. The basic component 16 is infed from the infeed unit 12 to the preparation unit 13 to which additives 17 may optionally also be infed. Alternatively, the additives 17 may also be infed to the infeed unit 12, as is shown in FIG. 2.

The basic component 16 and the additive or additives 17 are then mixed in the preparation unit 13. To this end, a driveless rotating mixer, a driven rotating mixer, or a static non-rotating mixer may again be provided in the preparation unit 13, said mixer mixing the components 16, 17 to be mixed in the preparation unit 13. The mixed components 16, 17 of the adhesive are then guided from the preparation unit 13 into the application unit 14 by means of which the adhesive may be applied to a workpiece. To this end, the application unit 14 again has a means such as an application roller 18, for example, by means of which the application of the adhesive onto the workpiece is performed.

As is shown in FIG. 2, apart from infeeding the basic component 16 of the adhesive, at least one additive is also infed by way of the infeed unit 12 such that the infeed unit 12 is already infed the basic component 16 and also the at least one additive 17, then guiding the two latter on to the preparation unit 13 in order for the components to be mixed, for example.

Infeeding of the basic component 16 to the infeed unit 12 and/or to the preparation unit 13 herein is preferably performed in a controlled automated manner. Alternatively, the basic component 16 may also be manually infed. The additives 17 are advantageously infed manually. Alternatively, these additives 17 may also be infed in an automated manner.

The preparation unit 13 again effects continuous mixing of the basic component 16 of the adhesive and the infed additive or additives 17, so as to form the prepared adhesive; said preparation unit also effects continuous conveying of the prepared adhesive.

To this end, the preparation unit optionally and preferably has a pump (not illustrated) which conveys the basic component or the mixed adhesive. If only the basic component is conveyed by the pump, then the mixed adhesive is also conveyed because the basic component accounts for the major part of the mixed adhesive.

Figure 3:
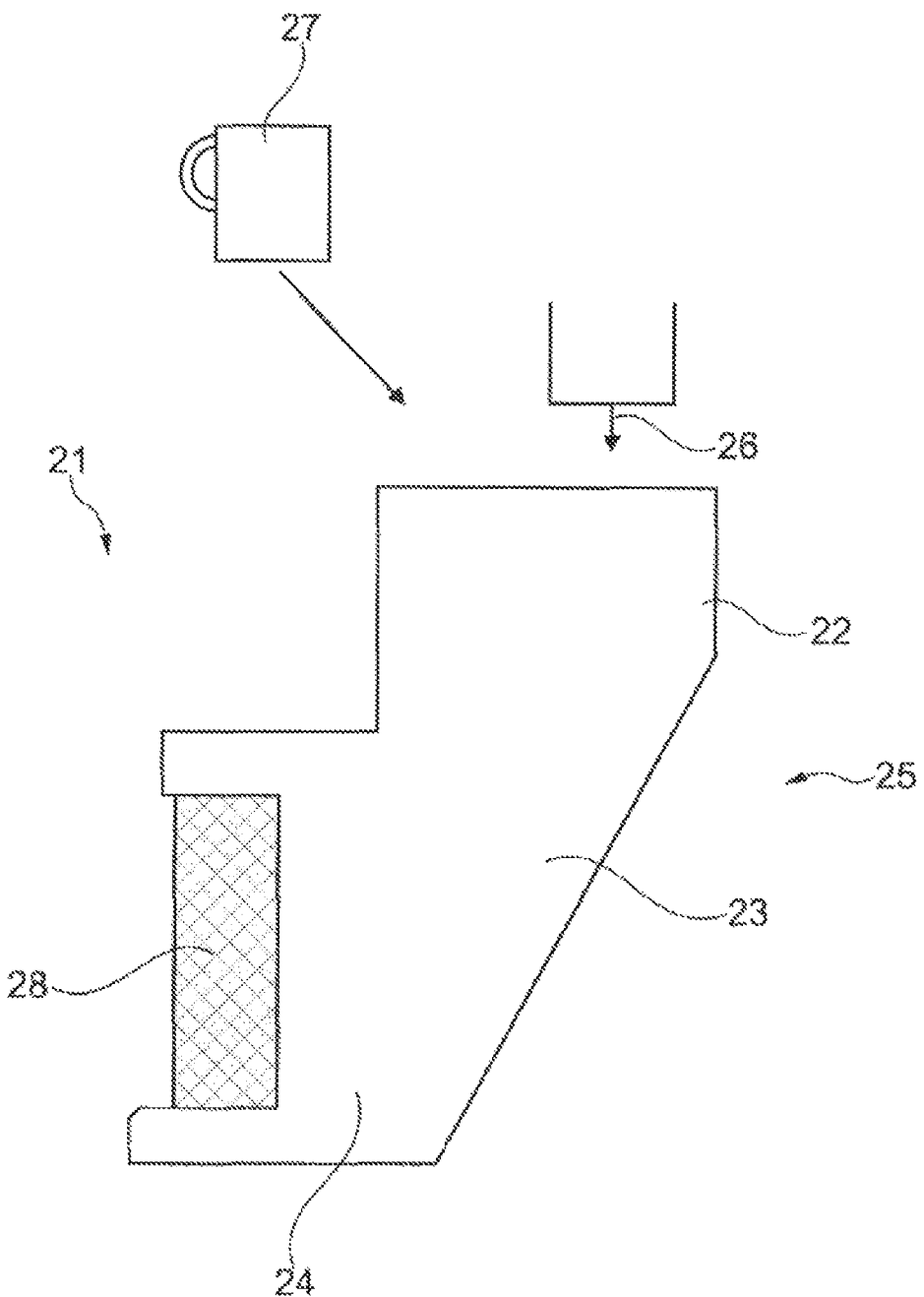
FIG. 3 shows a further exemplary embodiment of a device according to the invention, for preparing and applying adhesive.

FIG. 3 shows a further exemplary embodiment of the device 21 according to the invention, for preparing and applying adhesive. The device herein includes an infeed unit 22, a preparation unit 23, and an application unit 24 which all are integrated in a housing 25, or in a vessel, respectively.

The infeed unit 22 again serves for infeeding the basic component 26 of the adhesive, wherein the basic component 26 of the adhesive may be made available in liquid or fluid form, as has already been elaborated above. Also, the basic component 26 of the adhesive may be made available as a solid material, as granules, or as a powder or similar, and be filled into the infeed unit 22. To this end, the infeed unit 22 may optionally have a melting unit (not shown in FIG. 3, however) which serves for melting the basic component 26. The basic component 26 and the at least one additive 27 is infed from the infeed unit 22 to the preparation unit 23. The as component 26 and the additive or additives 27 are then mixed in the preparation unit 23.

To this end, a driveless rotating mixer, a driven rotating mixer, or a static non-rotating mixer may in turn be provided in the preparation unit 23, said mixer mixing the components 26, 27 to be mixed in the preparation unit 23. However, the application roller 28 which by virtue of the rotation thereof effects a flow in the preparation unit that mixes the basic component and the at least one additive may also indirectly serve as the mixer.

The mixed components 26, 27 of the adhesive are then discharged by the application unit 24 and are applied to a workpiece by means of the application roller 28.

As is shown in FIG. 3, apart from infeeding the basic component 26 of the adhesive, at least one additive is also infed by way of the infeed unit 22. Infeeding of the basic component 26 to the infeed unit 22 herein is preferably performed manually, wherein this may also alternatively be performed in a controlled manner. The additives 27 are advantageously infed manually. Alternatively, these additives 27 may also be infed in an automated manner.

Figure 4:
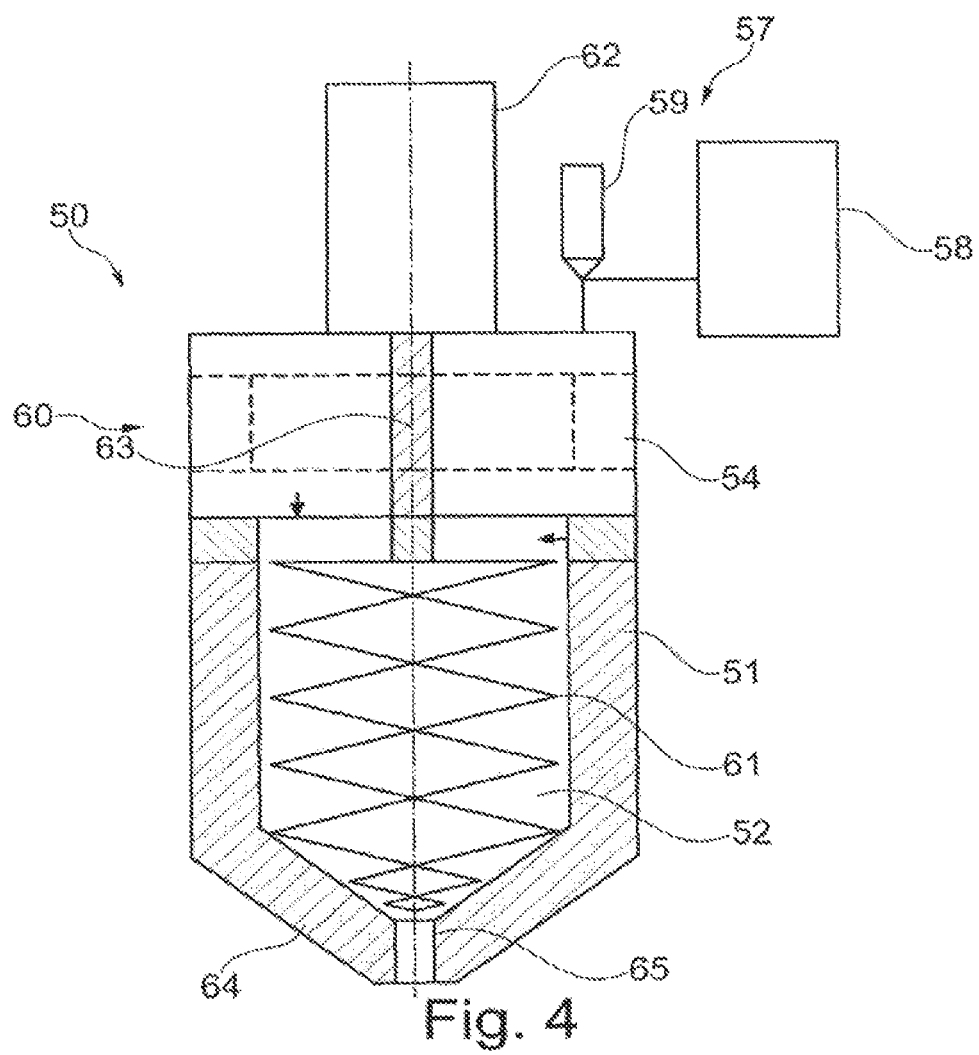
FIG. 4 shows a sectional view of an exemplary embodiment of a preparation device.
Figure 5:
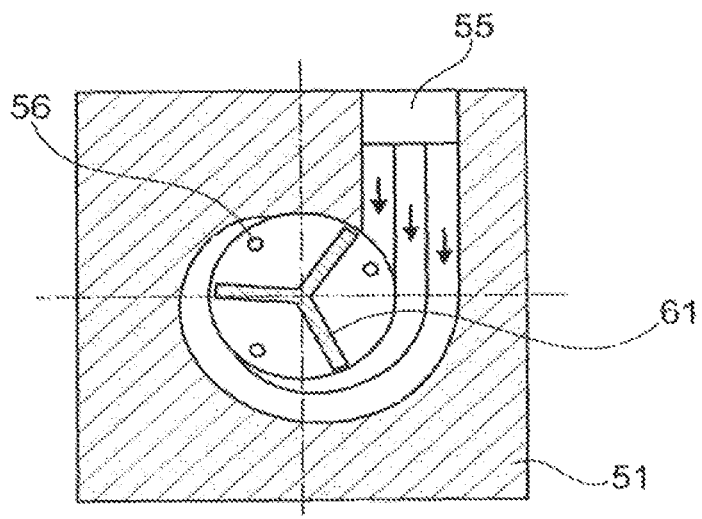
FIG. 5 shows a sectional view of the preparation device as per FIG. 4.
Figure 6:
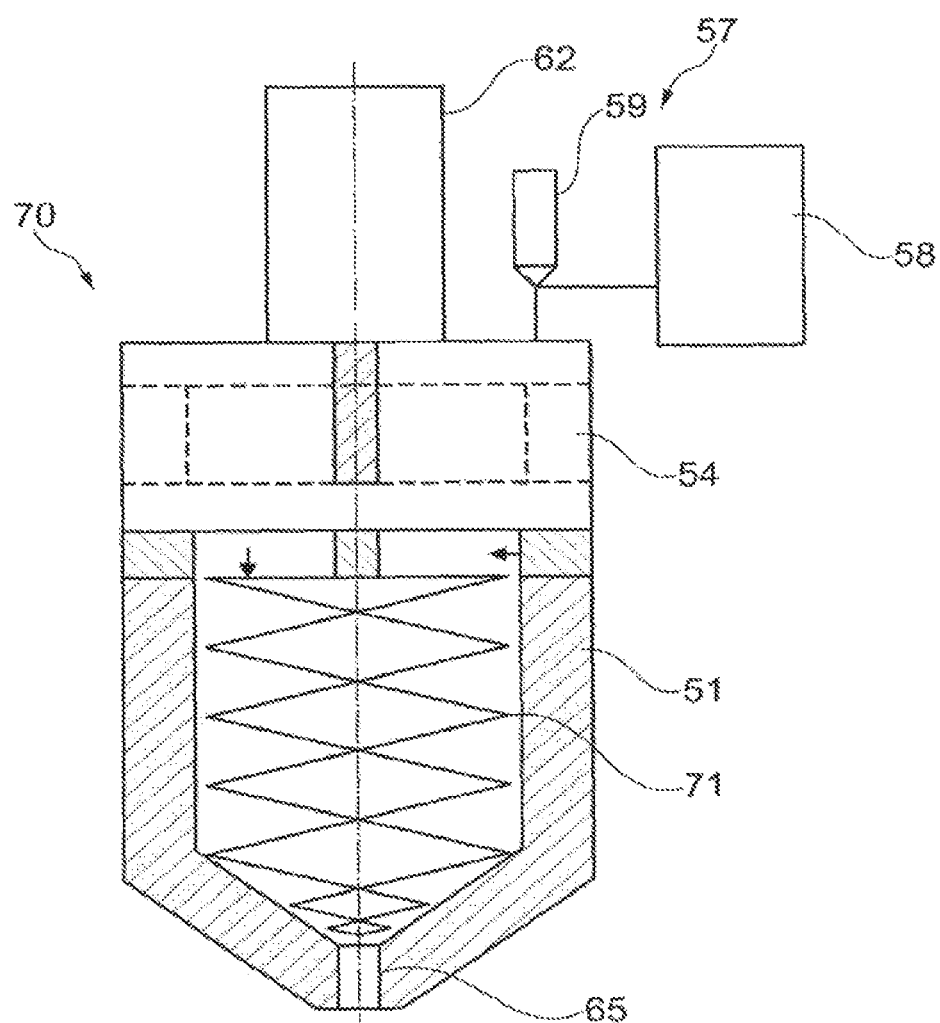
FIG. 6 shows a sectional view of a further exemplary embodiment of a preparation device.

FIG. 4 to 6 show exemplary embodiments of preparation units which are configured having dissimilar mixers.

FIG. 4 shows a preparation unit 50 having a housing 51 in which a volume 52 is configured as a mixing chamber. A pump 54 which effects conveying of the basic component and/or of the additive or additives into the mixing chamber 52 of the housing 51 is provided in the upper region 53 of the housing 51. To this end, the basic component, by way of an infeed 55 having entrances 56 to the mixing chamber, is admitted into the mixing chamber 52, see FIG. 5. Infeeding 55 by way of the helical duct routing effects distribution of the basic component in the mixing chamber 52. To this end, three ducts which admit the basic component into the mixing chamber at an angle of approximately 120° are formed in the exemplary embodiment, wherein the entrances 56 each are disposed so as be offset by 120°. The pump 54 may preferably be a gear pump.

The pump 54 serves as a metering unit for infeeding the basic component into the mixing chamber 52 in a metered manner.

A metering unit 57 which effects the metered addition of at least one additive is furthermore provided. To this end, the metering unit 57 may have a reservoir 58 and a valve 59 such that the metered addition is performed by actuating the valve 59. To this end, the pump 54 may be utilized in order for the additive to be conveyed into the mixing chamber 52. Alternatively, the metering unit 57 may also have a dedicated pump or an injector by means of which the at least one additive is metered into the mixing chamber 52.

The housing 51 is preferably heatable so that a melted basic component and/or also a melted additive may be processed in an ongoing melted state.

The preparation unit 50 has a mixing device 60 for mixing the basic component and/or the at least one additive. To this end, a rotatable mixing element 61 which for mixing the basic component and/or the at least one additive may be driven by a drive motor 62 by means of the shaft 63 is disposed in the mixing chamber 52. Accordingly, the mixing element 61 is a dynamic mixing means which may be twisted in a controlled manner. The drive motor 62 herein is preferably an electric motor or a motor having another type of drive. Apart from driving the mixing element 61, the motor 62 may also serve for driving the pump 54. On account thereof, one drive would be omitted because one drive could be utilized simultaneously for two purposes. Additionally or alternatively, the drive motor 62 may also be provided for driving the pump for conveying the addtives.

The mixing chamber 52 on the lower side 64 thereof preferably has an opening 65 by means of which the mixed adhesive may be discharged from the preparation unit 50.

Figure 7:
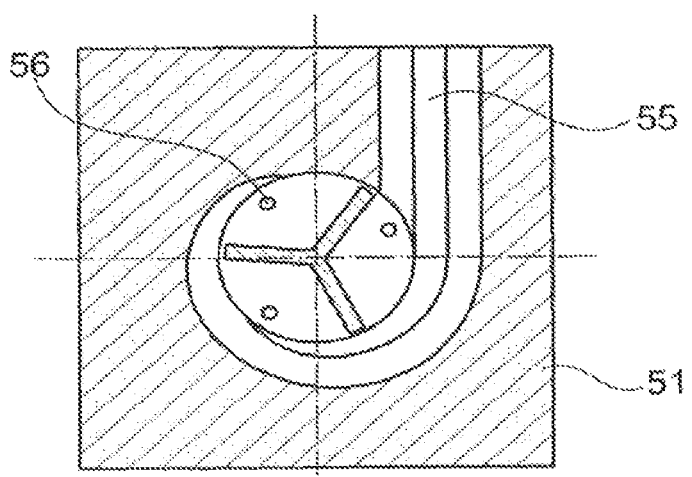
FIG. 7 shows a sectional view of the preparation device as per FIG. 6.

FIGS. 6 and 7 shows a further exemplary embodiment of a preparation unit 70 according to the invention, that is configured so as to be substantially similar to the preparation unit 50 of FIGS. 4 and 5.

As opposed to the example of FIGS. 4 and 5, the device 70 is provided with a driveless mixing element 71 which, while being rotatably mounted in the mixing chamber 52, is not configured so as to be drivable by the drive 62. The shaft 63 does not drive the mixing element 71. However, by virtue of the flow of the adhesive in the mixing chamber, the mixing element 71 may rotate, thus mixing the adhesive composed of the basic component and/or of the at least one additive.

Figure 8:
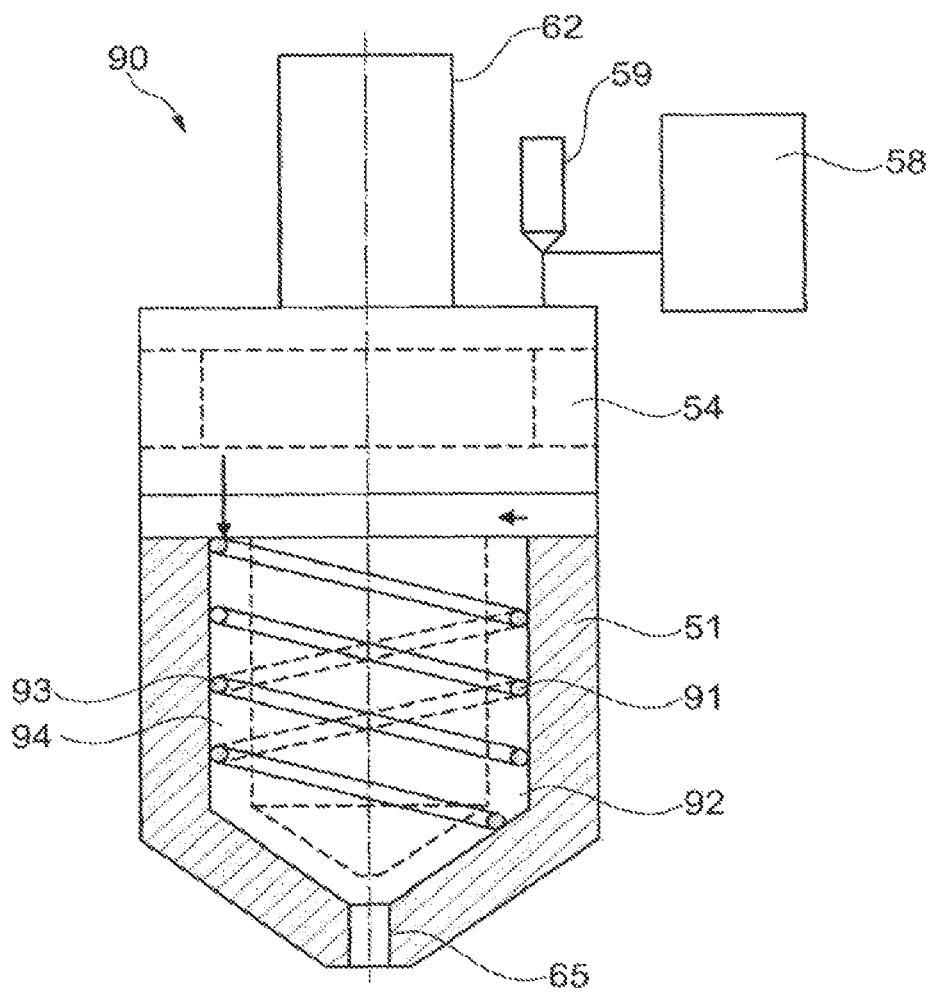
FIG. 8 shows a sectional view of a further exemplary embodiment of a preparation device.
Figure 9:
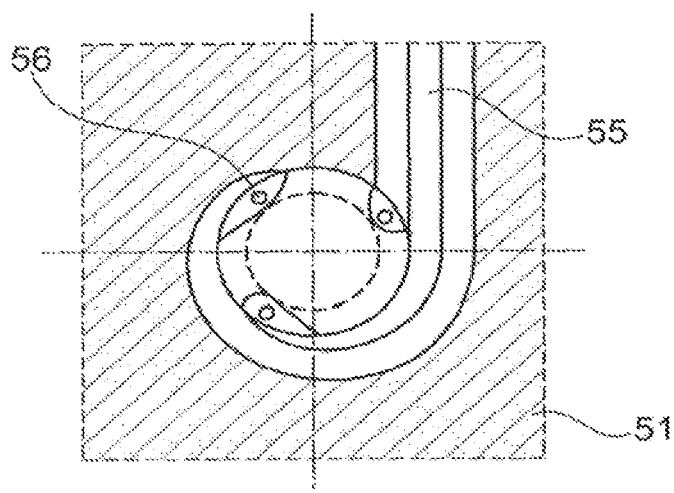
FIG. 9 shows a sectional view of the preparation device as per FIG. 8.

FIGS. 8 and 9 show a further exemplary embodiment of a preparation unit 90 according to the invention, that is configured as to be substantially similar the preparation unit 50 of FIGS. 4 and 5.

As opposed to the example of FIGS. 4 and 5, the device 90 is configured having a static mixer 91. The static mixer 91 is composed of a hollow cylinder 92 in which a spiral 93 is placed so as to form a helical flow path 94. The fluid basic component and the additives flow along the flow path and are intermixed there.

The mixer 91 is thus a static mixing means which is configured as a stationary mixing means in the mixing chamber, or on a wall of the mixing chamber, respectively. To this end, the mixing chamber is modified so as to form a helical flow path which is formed by a hollow-cylindrical chamber having a flow path therein that is configured in a helical manner.

The adhesive used is preferably a warm or hot-melt adhesive, wherein said adhesive may also be an adhesive that is not intended for heating.

The additives that are optionally used are preferably substances that influence the chemical properties, the biological properties, and/or the physical properties of the adhesive.

An additive herein may be a dye, a means for improving the resistance to moisture or the resistance to the formation of mold, a biocide means, and additive for improved absorption of energy, and/or a primer for improved adhesive bonding.

In this way, an additive may be a dye, for example. An additive may also be isocyanate or urea.

LIST OF REFERENCE SIGNS

1 Device
2 Infeed unit
3 Preparation unit
4 Application unit
5 Melting unit
6 Application roller
11 Device
12 Infeed unit
13 Preparation unit
14 Application unit
15 Melting unit
16 Basic component
17 Additive
18 Application roller
21 Device
22 Infeed unit
23 Preparation unit
24 Application unit
25 Housing
26 Basic component
27 Additive
28 Application roller
50 Preparation unit
51 Housing
52 Volume, mixing chamber
53 Upper region
54 Pump
55 Infeed
56 Entrance
57 Metering unit
58 Reservoir
59 Valve
60 Mixing device
61 Mixing element
62 Drive motor
63 Shaft
64 Lower side 65 Opening
70 Preparation unit
71 Mixing element
90 Preparation unit
91 Mixer
92 Hollow cylinder
93 Spiral
94 Flow path

The invention claimed is:

1. A device for preparing and applying an adhesive having at least one additive, the device comprising:
an infeed unit;
a preparation unit; and
an application unit;
wherein the infeed unit is configured to infeed either or both of a basic component of the adhesive and the at least one additive,
wherein the preparation unit comprises a housing bounding a mixing chamber, wherein the preparation unit has helical duct routing for introducing the basic component of the adhesive into the mixing chamber,
wherein the preparation unit is configured to effect continuous mixing of the basic component of the adhesive and the at least one additive so as to form the adhesive,
wherein the preparation unit is configured to continuously convey the adhesive from the preparation unit into the application unit,
wherein the application unit is configured to apply the adhesive to a workpiece,
wherein the basic component of the adhesive is a solid, granules, or a powder, wherein the infeed unit or the preparation unit has a heater for melting the basic component of the adhesive or the at least one additive,
wherein the application unit has an adhesive applicator, wherein the adhesive applicator is a nozzle or an application roller,
wherein the application unit has a reservoir configured for an intermediate storage of a defined amount of the adhesive.

2. The device as claimed in claim 1,
wherein the infeed unit or the preparation unit has a metering unit for infeeding the basic component of the adhesive or at least one additive in a metered manner.

3. The device as claimed in claim 1,
wherein the infeed unit is configured to allow manual infeeding of the basic component of the adhesive or of at least one additive.

4. The device according to claim 1,
wherein the infeed unit or the preparation unit comprises at least one pump configured to effect continuous infeeding or conveying of the basic component of the adhesive.

5. The device according to claim 1,
wherein the preparation unit has a mixing device configured for mixing the basic component of the adhesive or at least one additive.

6. The device according to claim 5,
wherein the mixing device comprises a dynamic mixing element configured to be driven by a rotatable mixing means.

7. The device according to claim 5,
wherein the mixing chamber has an outlet opening configured for discharging the mixed adhesive to the application unit.

8. The device according to claim 5,
wherein the mixing chamber has a static mixing element or dynamic mixing element.

9. The device according to claim 8,
wherein the static mixing element is a stationary mixing element arranged in the mixing chamber or on a wall of the mixing chamber, wherein the static mixing element is formed by a hollow-cylindrical chamber having a helically configured flow path therein.

10. The device according to claim 9,
wherein the static mixing element is configured by a helical spiral that is disposed or configured on the wall of the mixing chamber.

11. The device according to claim 9,
wherein the helically configured flow path is formed by a helical spiral inserted into the hollow-cylindrical chamber.

12. The device according to claim 1,
wherein the reservoir is configured to continue to convey the adhesive into the application unit when the infeed unit and the preparation unit are temporarily not functioning.

13. The device according to claim 1,
wherein the application roller is configured in the reservoir to rotate to allow mixing therein.

14. The device according to claim 1,
wherein the infeed unit or the preparation unit is configured to allow a controlled infeeding of the basic component of the adhesive or of the at least one additive.

15. The device according to claim 1,
wherein the infeed unit or the preparation unit comprises at least one pump configured to effect continuous or discrete infeeding of at least one additive.

16. The device according to claim 12,
wherein the reservoir is configured to convey the adhesive into the application unit when the preparation unit is being filled or due to a changeover of the at least one additive from one composition to another.

17. The device according to claim 1,
wherein the at least one additive comprises a dye.

18. The device according to claim 1,
wherein the at least one additive comprises a substance which improves moisture resistance.

19. The device according to claim 1,
wherein the at least one additive comprises a substance which improves resistance to the formation of mold.

20. The device according to claim 1,
wherein the at least one additive comprises a biocide.

21. The device according to claim 1,
wherein the at least one additive comprises an additive for improving absorption of energy.

22. The device according to claim 1,
wherein the at least one additive comprises a primer for improving adhesive bonding.

23. A device for preparing and applying an adhesive having at least one additive, the device comprising:
an infeed unit;
a preparation unit; and
an application unit comprises an application roller
wherein the infeed unit is configured to infeed either or both of a basic component of the adhesive and the at least one additive,
wherein the preparation unit comprises a housing bounding a mixing chamber, wherein the preparation unit has helical duct routing for introducing the basic component of the adhesive into the mixing chamber,
wherein the preparation unit is configured to effect continuous mixing of the basic component of the adhesive and the at least one additive so as to form the adhesive, wherein the preparation unit is configured to continuously convey the adhesive from the preparation unit into the application unit, wherein the application unit is configured to apply the adhesive to a workpiece, wherein the basic component of the adhesive is a solid, granules, or a powder, wherein the infeed unit or the preparation unit has a heater for melting the basic component of the adhesive or the at least one additive, wherein the preparation unit has a mixing device configured for mixing the basic component of the adhesive or at least one additive, wherein the mixing device comprises a dynamic mixing element configured to be driven by a rotatable mixing means.

24. A device for preparing and applying an adhesive having at least one additive, the device comprising:

an infeed unit;

a preparation unit; and an application unit;

wherein the infeed unit is configured to infeed either or both of a basic component of the adhesive and the at least one additive, wherein the preparation unit comprises a housing bounding a mixing chamber, wherein the preparation unit has helical duct routing for introducing the basic component of the adhesive into the mixing chamber, wherein the preparation unit is configured to effect continuous mixing of the basic component of the adhesive and the at least one additive so as to form the adhesive, wherein the preparation unit is configured to continuously convey the adhesive from the preparation unit into the application unit, wherein the application unit is configured to apply the adhesive to a workpiece, wherein the basic component of the adhesive is a solid, granules, or a powder, wherein the infeed unit or the preparation unit has a heater for melting the basic component of the adhesive or the at least one additive, wherein the application unit has an adhesive applicator, wherein the adhesive applicator is a nozzle or an application roller, wherein the application unit has a reservoir configured for an intermediate storage of a defined amount of the adhesive, wherein the application roller is configured in the reservoir to rotate to allow mixing therein.

* * * * *